(12) United States Patent
D'Agosta

(10) Patent No.: US 11,771,060 B2
(45) Date of Patent: Oct. 3, 2023

(54) ANIMAL HOOF TAPE

(71) Applicant: Ralph D'Agosta, New Milford, CT (US)

(72) Inventor: Ralph D'Agosta, New Milford, CT (US)

( * ) Notice: Subject to any disclaimer, the term of this patent is extended or adjusted under 35 U.S.C. 154(b) by 160 days.

(21) Appl. No.: 16/351,040

(22) Filed: Mar. 12, 2019

(65) Prior Publication Data

US 2019/0281792 A1    Sep. 19, 2019

Related U.S. Application Data

(60) Provisional application No. 62/642,874, filed on Mar. 14, 2018.

(51) Int. Cl.
| | |
|---|---|
| *A01K 13/00* | (2006.01) |
| *A01L 5/00* | (2006.01) |
| *A01L 15/00* | (2006.01) |
| *A01L 3/00* | (2006.01) |

(52) U.S. Cl.
CPC .............. *A01K 13/007* (2013.01); *A01L 5/00* (2013.01); *A01L 15/00* (2013.01); *A01L 3/00* (2013.01)

(58) Field of Classification Search
CPC ......... A01K 13/007; A01L 5/00; A01L 15/00; A01L 3/00; A01L 3/02; A61D 9/00; A61D 9/02
USPC ............................... 119/850; 168/26, 27, 28
See application file for complete search history.

(56) References Cited

U.S. PATENT DOCUMENTS

| | | | | |
|---|---|---|---|---|
| 1,673,650 | A * | 6/1928 | Tweed ...................... | A01L 5/00 168/28 |
| 4,503,914 | A * | 3/1985 | Voland ...................... | A01L 5/00 168/18 |
| 6,122,901 | A * | 9/2000 | Schultz .................... | A61D 9/00 168/27 |
| 6,863,033 | B1 * | 3/2005 | Fleming ................... | A61D 9/00 36/111 |
| 7,818,952 | B1 * | 10/2010 | LeCompte .............. | A01L 15/00 54/82 |
| 8,664,466 | B2 * | 3/2014 | Tilghman ................. | A61D 9/00 602/58 |

(Continued)

FOREIGN PATENT DOCUMENTS

| | | | | |
|---|---|---|---|---|
| GB | 1269721 | A * | 4/1972 | ............... A01L 3/00 |
| GB | 2524240 | A * | 9/2015 | ........... A01K 13/007 |

*Primary Examiner* — Peter M Poon
*Assistant Examiner* — Carly W. Lynch
(74) *Attorney, Agent, or Firm* — WHITMYER IP GROUP LLC

(57) ABSTRACT

A protective cover for an animal hoof is provided that includes a sheet having a first side, a second side, and an exterior edge surrounding an interior area of the sheet. The exterior edge includes a plurality of slits extending from the exterior edge to the interior area of the sheet, and flaps of the sheet between each of the plurality of slits. The first side has an adhesive material and the second side has a textured surface. The protective cover may be applied by providing the protective cover; removing the film from the adhesive material; applying the first side with the adhesive material to a center of a bottom of the animal hoof; folding the flaps of the sheet between each of the plurality of slits; and pressing the protective cover against the animal hoof toe, heel, and sidewalls.

17 Claims, 3 Drawing Sheets

(56) References Cited

U.S. PATENT DOCUMENTS

| | | | |
|---|---|---|---|
| 2007/0068125 A1* | 3/2007 | Davis | A01L 15/00 54/82 |
| 2013/0219838 A1* | 8/2013 | Swearingen | B05D 1/02 54/82 |
| 2014/0260126 A1* | 9/2014 | Riley | A01L 15/00 54/82 |
| 2016/0262349 A1* | 9/2016 | Swearingen | A01K 13/007 |

* cited by examiner

ANIMAL HOOF TAPE

TECHNICAL FIELD

This invention relates to protective covers for animal hoofs and feet, and more particularly relates to horse hoof-shaped tape to protect and medicate a horse hoof.

BACKGROUND

Horses and other animals often suffer from problems including hoof abscesses and injuries to their hoofs and feet. Animals and their hoofs are also exposed to the ground and various weather conditions, and their hoofs need to be in working condition for constant walking and work outdoors and indoors. Previous techniques of aiding the healing process include use of a horseshoe, boot, or wraps on the animal's hoofs. Previous techniques also include an adhesive with additional straps that wrap around an animal's ankle and leg. However, horseshoes, boots, and wraps are undesirable because they often detach from the animal's hoof, leading to chipping and cracking in the animal's hoof and may not provide enough grip that is necessary for the animal's constant walking and working. In addition, when using wraps, an animal is disadvantageously required to be still and confined indoors in an enclosed box stall for a longer period of time during application of the wrap and during its use. Therefore, there is a need for a single-piece, indoor or outdoor all-weather condition, protective cover that is easier to apply and longer lasting once applied that protects the hoof for outdoor activity and indoor medical treatment and offers an outside non-slip surface for all weather conditions and a method for applying the same.

SUMMARY

According to an aspect of the present invention, a protective cover for an animal hoof is provided that includes a sheet having a first side, a second side, and an exterior edge surrounding an interior area of the sheet. The exterior edge includes a plurality of slits extending from the exterior edge to the interior area of the sheet, and a portion of the sheet between each of the plurality of slits. The first side has an adhesive material and the second side has a textured surface.

According to an aspect of the present invention, a method for applying a protective cover to an animal hoof is provided that includes the steps of, but is not limited to: providing the protective cover for outdoor and indoor terrain, activity, protection, and medical treatment, the protective cover including a sheet having a first side with an adhesive material and a film covering the adhesive material, a second side with a textured surface, and an exterior edge surrounding an interior area of the sheet, and the exterior edge having a plurality of slits extending from the exterior edge to the interior area of the sheet and a portion of the sheet between each of the plurality of slits; removing the film from the adhesive material; applying the first side having the adhesive material to a center of a bottom of the animal hoof; folding the portions of the sheet between each of the plurality of slits; pressing the protective cover against the animal hoof toe, heel, and sidewalls. The method also includes the step of overlapping the portions of the sheet between each of the plurality of slits for conforming fit to conform and secure to the hoof whether standing, walking, or running. The sheet protects the hoof for outdoor activity and indoor medical treatment, and offers an outside, non-slip surface for all weather conditions In addition to, or as an alternative to, one or more of the features described above, further aspects of the present invention can include one or more of the following features, individually or in combination:

- the sheet is substantially hoof shaped and configured to conform and secure to an animal hoof when standing, walking, or running. It will not conflict with the animal's natural ability to walk and interfere with other feet when walking or running;
- the first side includes a protective film covering the adhesive material;
- the film is removably attachable to the adhesive material and configured for ease of application to the hoof;
- the second side is a non-slip material configured for durability in outdoor terrain weather conditions;
- the second side is a water-resistant material;
- the portion of the sheet between each of the plurality of slits is foldable to substantially cover a surface of the animal hoof and configured for durability if outdoor terrain weather conditions exist. These portions also add protection and integrity to the hoof;
- the sheet is removably attachable to the animal hoof;
- the protective cover is configured to secure medicine to a surface of the animal hoof and provide a clean, dry environment to prevent contamination of a healing injury;
- the sheet includes an elastic material;
- each of the plurality of slits is substantially wedge-shaped, configured to be a uniformed fit, will not conflict with the animal's natural ability to walk, and will not interfere with other feet when walking or running.

DETAILED DESCRIPTION

Figure 1:
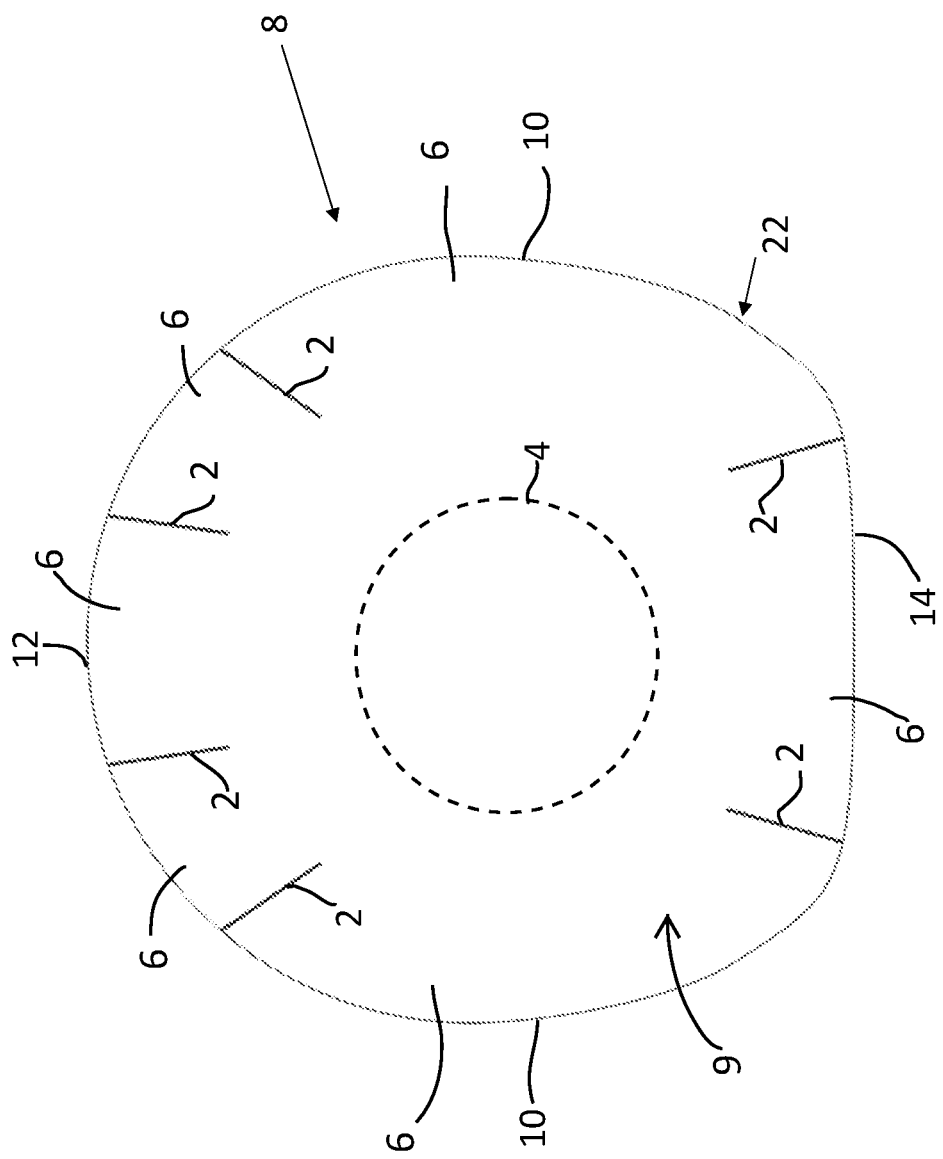
FIG. 1 illustrates a plan view of the protective cover for an animal hoof according to the present disclosure.

Referring now to the drawings, FIG. 1 describes the protective cover 8 for an animal hoof. The protective cover 8 includes a sheet 9 with an exterior edge 22 that surrounds the interior area 4 of the sheet. The exterior edge 22 includes a plurality of slits 2 that extend from the exterior edge 22 towards the interior area 4 of the sheet 9. In one example the plurality of slits 2 may be lines cut into the sheet 9. In one example the plurality of slits 2 may be wedge-shaped cutouts. The portion of the sheet 9 between slits 2 form flaps 6. Flaps 6 are foldable against one another so that the sheet 9 and protective cover 8 can better fit the shape of an animal's hoof.

The protective cover 8 is configured to be anatomically correct and able to fit on and cover an animal's hoof. The sheet 9 may be in the shape of an animal's hoof with sides 10, heel 14, and toe 12 corresponding to the same on the animal's hoof. The sheet 9 of the protective cover 8 may include an elastic band or material near the exterior edge 22 to allow for additional support of the protective cover 8 against an animal hoof 30.

Figure 2:
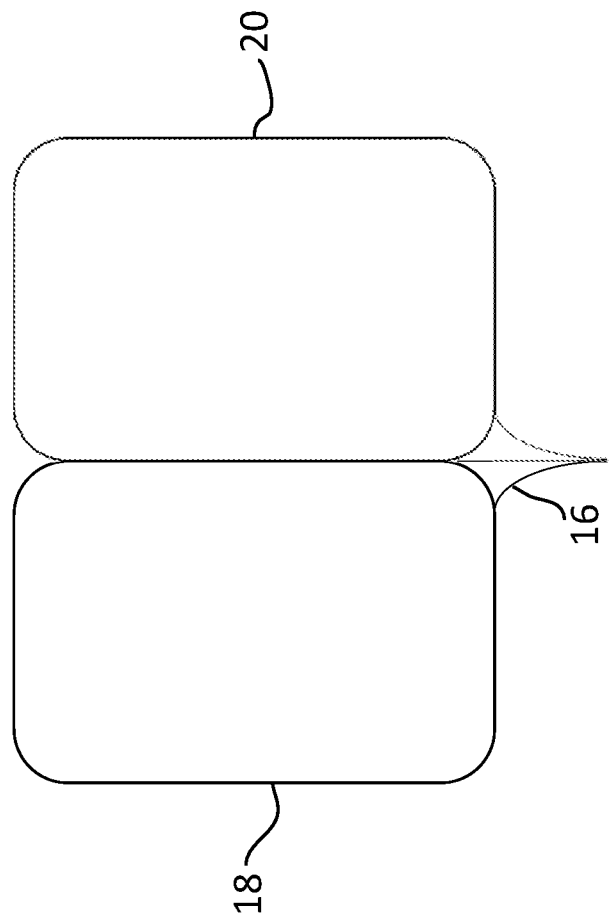
FIG. 2 illustrates a perspective view of the first and second sides of the sheet of the protective cover according to the present disclosure.

FIG. 2 shows the protective cover 8 of FIG. 1. Protective cover 8 includes a first side 18 and a second side 16. The first side 18 and the second side 16 may be on opposing sides of the protective cover 8. The first side 18 is made of an adhesive material that adheres to the animal's hoof. The first side 18 also includes a film 20. Film 20 serves to cover and protect the adhesive material and is removed from the first side 18 prior to applying the protective cover to the animal's hoof 30. The second side 16 may have a textured surface. The second side 16 can be made of a water-resistant, shark-skin like textured material, or a non-slip material to allow for better grip while the animal is walking. The protective cover 8 is anatomically hoof-shaped and is able to fit any animal hoof.

Figure 3:
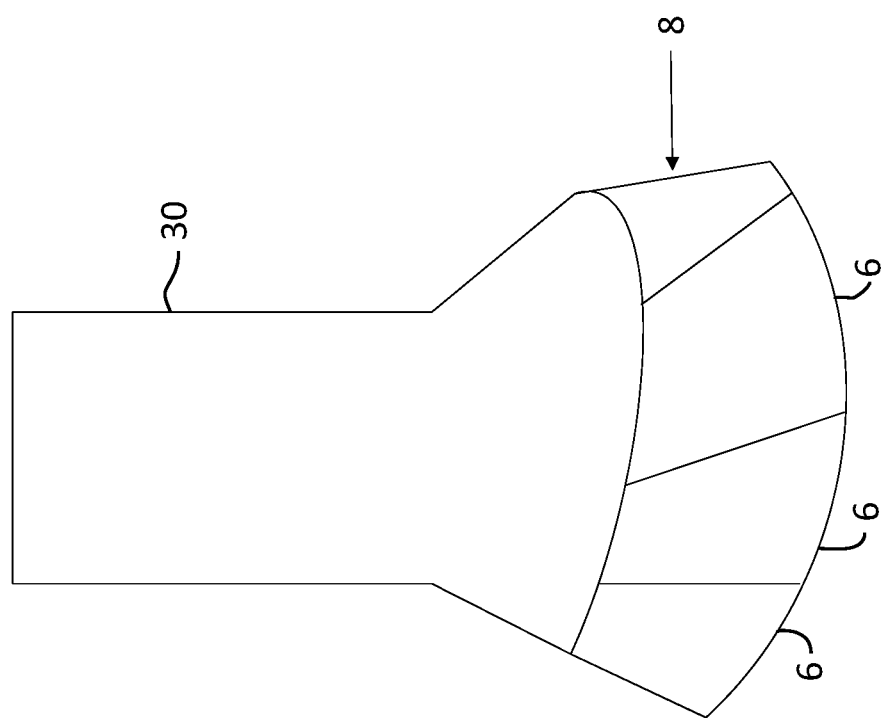
FIG. 3 illustrates a perspective view of the protective cover according to the present disclosure on an animal hoof.

FIG. 3 shows the protective cover 8 on an animal hoof 30. The protective cover 8 includes flaps 6 that are formed by the portion of the sheet 9 between each of the plurality of slits 2. As shown in FIG. 3, the flaps 6 may overlap one another in order for the protective cover 8 to better fit the animal hoof 30.

According to one example, a method of applying the protective cover 8 on an animal hoof 30 may include, but is not limited to, providing a protective cover 8, the protective cover 8 including a sheet 9 having a first side 18 with an adhesive material and a film 20 covering the adhesive material, a second side 16 with a textured surface, and an exterior edge 22 surrounding an interior area 4 of the sheet 9, and the exterior edge 22 having a plurality of slits 2 extending from the exterior edge 22 to the interior area 4 of the sheet 9, and a portion 6 of the sheet 9 between each of the plurality of slits 2; removing the film 20 from the adhesive material; applying the first side 18 having the adhesive material to a center of a bottom of the animal hoof; folding the portions 6 of the sheet 9 between each of the plurality of slits 2; pressing the protective cover 8 against the animal hoof toe, heel, and sidewalls. The flaps or portions 6 of the sheet 9 between each of the plurality of slits 2 can be overlapped to provide better coverage of the animal's hoof.

The protective cover 8 offers several advantages over known bandages. The protective cover 8 is anatomically correct and in a shape of an animal's hoof. In using the protective cover 8, a user pulls the film 20 from the first side 18 to expose the adhesive material and does not have to use additional attaching means such as a wrap or boot. The one-piece design of the protective cover 8 allows for easier use to protect or medicate an animal's hoof and is not as time consuming or dangerous as the previous techniques. A user can store medicine within and against the protective cover 8. The flaps 6 can be specifically cut to provide for a better fit and adhesion to an animal's hoof 30.

The textured material (water-resistant, slip-proof, shark skin-like texture) of the second side 16 allows for reduced slipping, and improved confidence when an animal is walking and exposed to the ground and other environmental and weather conditions. The material of the second side 16 is also water resistant to prevent wet elements from seeping into the medicated hoof area. The protective cover 8 is made of a durable fabric material that also protects the animal hoof walls from chipping and cracking. The protective cover 8 can be used on animals including horses with horseshoes as well as barefoot horses.

While several examples have been disclosed, it will be apparent to those of ordinary skill in the art that aspects of the present invention include many more examples and implementations. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one example can be used alone or in combination with one or more features of one or more other examples.

What is claimed is:

1. A protective cover for an animal hoof, the protective cover comprising:
    a sheet having a first side, a second side, and an exterior edge surrounding an interior area of the sheet, the exterior edge being curved to form a substantially circular shape, the sheet further including lateral sides, a toe portion, and a heel portion that correspond to sides, toe and heel portions of the animal hoof when the sheet covers the animal hoof;
    wherein the exterior edge includes a plurality of linear slits extending from the exterior edge to the interior area of the sheet, along the toe portion and the heel portion, and a portion of the sheet between each of the plurality of slits, the plurality of linear slits each being lines cut into the sheet;
    wherein when covering the animal hoof, a first part of the portion of the sheet is overlapped over a second part of the portion of the sheet, the first part and the second part being on opposite sides of one of the plurality of slits;
    the first side having an adhesive material; and
    the second side having a textured surface.

2. The protective cover according to claim 1, wherein the sheet is a shape configured to cover at least a bottom of a hoof.

3. The protective cover according to claim 1, wherein the first side includes a film covering the adhesive material.

4. The protective cover according to claim 3, wherein the film is removably attachable to the adhesive material.

5. The protective cover according to claim 3, wherein the film is removably attachable to the adhesive material and configured for ease of application to the hoof.

6. The protective cover according to claim 1, wherein the second side is a non-slip material.

7. The protective cover according to claim 1, wherein the second side is a water-resistant material.

8. The protective cover according to claim 1, wherein the portion of the sheet between each of the plurality of slits is foldable to substantially cover a surface of the animal hoof.

9. The protective cover according to claim 1, wherein the sheet is removably attachable to the animal hoof.

10. The protective cover according to claim 1, wherein the protective cover is configured to secure medicine to a surface of the animal hoof.

11. The protective cover according to claim 1, wherein the sheet includes an elastic material.

12. The protective cover according to claim 1, wherein the sheet is a shape configured to cover at least a bottom of a hoof and configured to conform and secure to an animal hoof when standing, walking, or running.

13. The protective cover according to claim 1, wherein the second side is a non-slip material configured for durability in outdoor terrain weather conditions.

14. The protective cover according to claim 1, wherein the portion of the sheet between each of the plurality of slits is foldable to substantially cover a surface of the animal hoof and configured for durability if outdoor terrain weather conditions exist.

15. The protective cover according to claim 1, wherein the protective cover is configured to secure medicine to a surface of the animal hoof, and provide a clean, dry environment to prevent contamination of a healing injury.

16. A method for applying a protective cover to an animal hoof comprising:
> providing the protective cover, the protective cover including a sheet having a first side with an adhesive material and a film covering the adhesive material, a second side with a textured surface, and an exterior edge surrounding an interior area of the sheet, the exterior edge being curved to form a substantially circular shape, the sheet further including lateral sides, a toe portion, and a heel portion that correspond to sides, toe and heel portions of the animal hoof when the sheet covers the animal hoof, and the exterior edge having a plurality of linear slits extending from the exterior edge to the interior area of the sheet, along the toe portion and the heel portion, and a portion of the sheet between each of the plurality of slits, the plurality of linear slits each being lines cut into the sheet;
> removing the film from the adhesive material;
> applying the first side having the adhesive material to a center of a bottom of the animal hoof;
> folding the portion of the sheet between each of the plurality of slits;
> overlapping the portion of the sheet between each of the plurality of slits; and
> pressing the sheet against the animal hoof.

17. The method according to claim 16, further comprising:
> overlapping the portion of the sheet between each of the plurality of slits to conform and secure to the hoof whether standing, walking, or running.

* * * * *